July 4, 1967  N. H. HACKETT  3,328,959
HYDRAULIC BRAKE SYSTEMS
Filed July 30, 1965  3 Sheets-Sheet 1

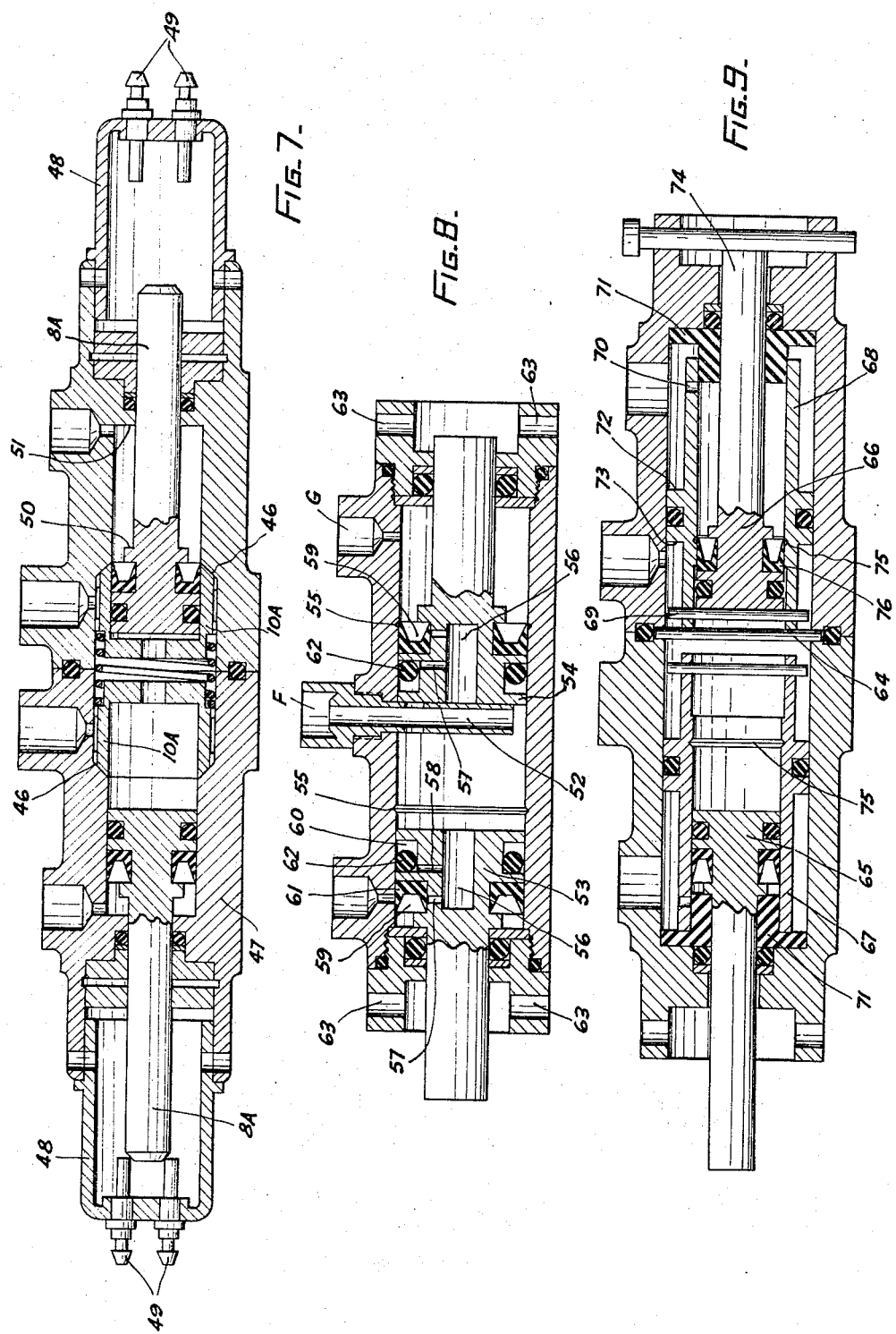

United States Patent Office 3,328,959
Patented July 4, 1967

3,328,959
HYDRAULIC BRAKE SYSTEMS
Norman Henry Hackett, Flat 2, Eastbourne Flats, 19 Imperial Ave., Bondi, near Sydney, New South Wales, Australia
Filed July 30, 1965, Ser. No. 477,361
Claims priority, application Australia, Feb. 22, 1965, 55,438/65; Apr. 8, 1965, 57,420/65
11 Claims. (Cl. 60—54.5)

This invention relates to hydraulic brake systems of the kind subject of my Australian Patent 228,521. FIG. 5 of the drawings belonging to that patent illustrates a running brake unit. This unit has proved itself effective in practice but it is possible for one or both of its two pistons to be unintentionally (knocked or otherwise) moved into the bleeding position shown in the said FIG. 5 and then remain in that position when a next brake application is made. If that should happen, the danger arises, in the event of failure of one brake sub-system, of the other sub-system being rendered equally ineffective.

The object of this invention is to remedy the indicated shortcoming.

The invention may be summarised as follows:

In a hydraulic brake system of the kind comprising a master cylinder, two sub-systems each incorporating brake shoe actuating means and concurrently operable by fluid pressure increase in said master cylinder, and means to enable either of said sub-systems to remain effective notwithstanding failure of the other; a running brake unit comprising, for each of said sub-systems, an operating cylinder having an outlet pipe leading from its downstream end to its related shoe actuating means and its upstream end open to said master cylinder by way of a fluid inlet duct, a piston in said cylinder, a movable valve closure operatively associated with said piston and so arranged as to remain closed when said piston is at any point in said operating cylinder other than the upstream end of said piston's movement range within said cylinder, and obstruction means whereby said piston may be held at said upstream end of its movement range thereby to permit opening of said valve closure so to by-pass said piston and render said outlet pipe and said inlet duct each directly communicable with the other.

Examples of the invention are illustrated in the drawings herewith.

FIG. 1 is a diagrammatic layout of a hydraulic brake system showing two sub-systems, indicated by A and B, and a running brake unit C which may be any one of those described herein with reference to the remaining figures of the drawings. The running brake unit is connected to the master cylinder D (having operating pedal E) by way of an inlet duct F. Each of the sub-systems is connected to the unit C by an outlet pipe G.

In the remaining figures of the drawings:

FIG. 2 is a cross-sectional side elevation of a running brake unit with its parts positioned as they would be in normal use.

FIG. 3 repeats a portion of FIG. 1 but with the parts in their positions for draining the brake system and replenishing it with brake fluid.

FIGS. 6 to 9 are sections showing still further modified constructions.

In each of the illustrated examples of brake units, the parts for each sub-system are virtually the same, hence only one (in each case) need be described.

Figure 1:
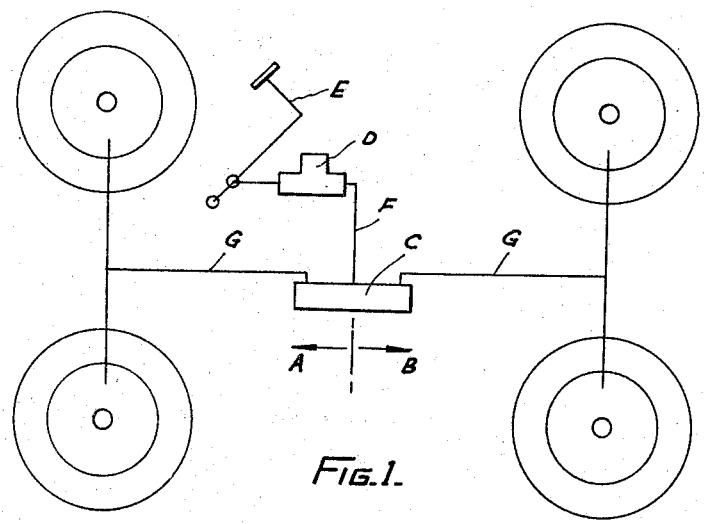
Figure 2:
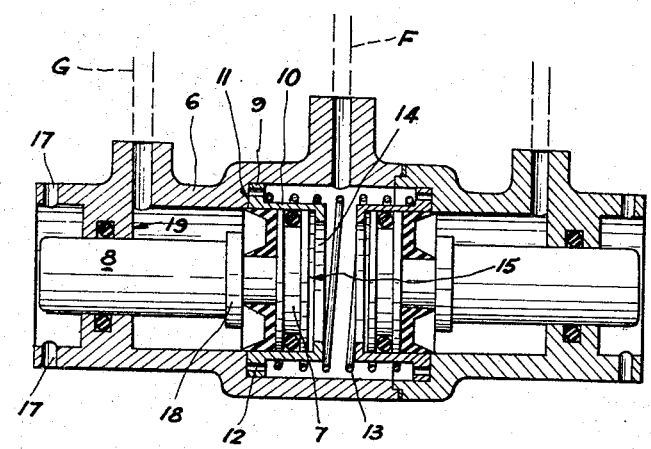
Figure 3:
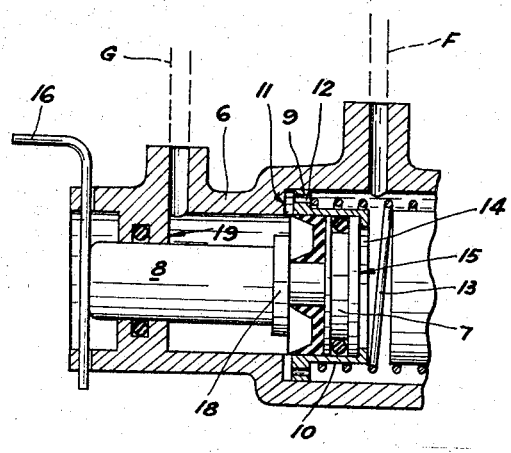

Referring to FIGS. 2 and 3, operating cylinder 6 has an outlet pipe G leading from its downstream end to its related shoe-actuating means. Its upstream end is open to the master cylinder (D in FIG. 1) by way of fluid inlet duct F. Piston 7, on stem 8, is slidable within cylinder 6. The movable valve closure, in the embodiment now under discussion, is constituted by an outwardly directed flange 9 on a sleeve 10. This flange is able to seat upon a counterbore shoulder 11, and it has holes 12 extending through it. Compression spring 13 constantly urges the flange 9 to remain seated against the shoulder 11 as shown in FIG. 2. An inwardly directed flange 14 on the sleeve 10 constitutes obstruction means against which the upstream end face 15 of the piston may abut when the piston is at the upstream end of its movement range as shown in FIG. 3. A stop-pin 16 may be thrust through holes 17 in an extension of the cylinder casing when it is required to hold the piston at the upstream end of its movement range, also as shown in FIG. 3.

During ordinary brake usage, fluid pressure increase on the upstream face 15 of the piston 7 causes the piston to exert corresponding pressure in the fluid on the downstream side of the piston and thus the brakes are applied. The spring 13 keeps the flange 9 closed upon the shoulder 11 throughout this ordinary usage action.

If one of the sub-systems fails by leakage or otherwise so that it fails to hold its supply of brake fluid, then the piston for that sub-system will move in the downstream direction until its collar 18 abuts the downstream end face 19 of the cylinder. This will cause the failing sub-system to remain isolated while the unfailing one still remains fully effective.

If there should be excessive pressure build-up in a sub-system, through overheating due to over-use of brakes or otherwise, the related piston will move to the position shown in FIG. 3 thus to move the flange 9 from its seat so that the excess pressure will be relieved by way of holes 12. When this relief has ended the spring 13 will reseat the flange 9 on its seating shoulder 11, and revert the piston to its normal working position. During this action the stop-pin 16 will, of course, be absent from the holes 17.

When a sub-system is to be bled or drained and replenished, the related stem 8 is pushed inwardly (by hand) and there held by insertion of the stop-pin 16 as shown in FIG. 3. This will give and maintain a clear passage between pipes G and F, by way of holes 12, thus to enable draining and like action to be carried out in common manner.

Figure 4:
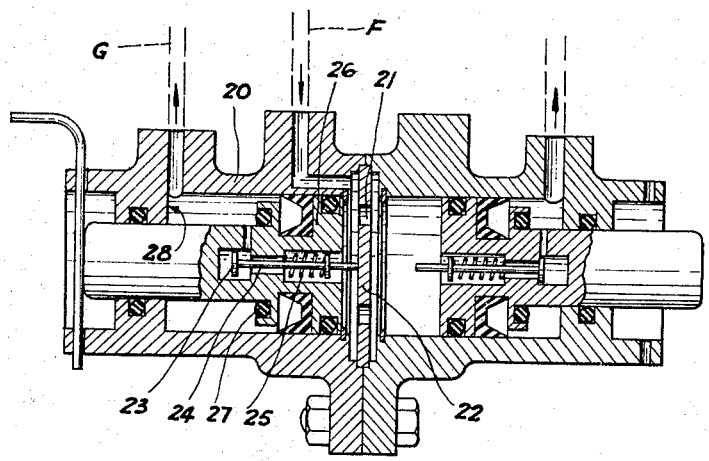
FIG. 4 is a view similar to FIG. 2 showing a running brake unit of modified construction, with the parts of one sub-system (in the right hand half of the figure) in normal running position, and the rest of the parts, belonging to the other sub-system, in draining and replenishment position.

Referring to FIG. 4, the operating cylinder 20 has outlet pipe G and inlet duct F. The right hand cylinder (in FIG. 4) is open to duct F by way of holes 21 in an obstruction plate 22 referred to later herein. In this instance the movable valve closure is constituted by a valve head 23 on a stem 24 which is loaded towards its closed position (as shown on the right hand side of FIG. 4) by a compression spring 25. The items 23, 24 and 25 are disposed in a passage (which includes a seating for valve head 23) formed, as shown in FIG. 4, so that it opens to both the upstream and downstream sides of the piston 26.

During normal use, both pistons 26 are positioned somewhat as shown to the right of FIG. 4 with the valve heads 23 closed. If one sub-system fails, its piston moves outwardly as previously explained, and fluid loss into the failed sub-system (through opening of the valve head 23) is prevented by sealing ring 27 seating against the downstream end face 28 of the cylinder 20. When the piston is at the upstream end of its movement range as shown on the left hand side of FIG. 4 the valve head 23 is kept off its seat by reason of the stem 24 being obstructed by the obstruction plate 22.

Figure 5:
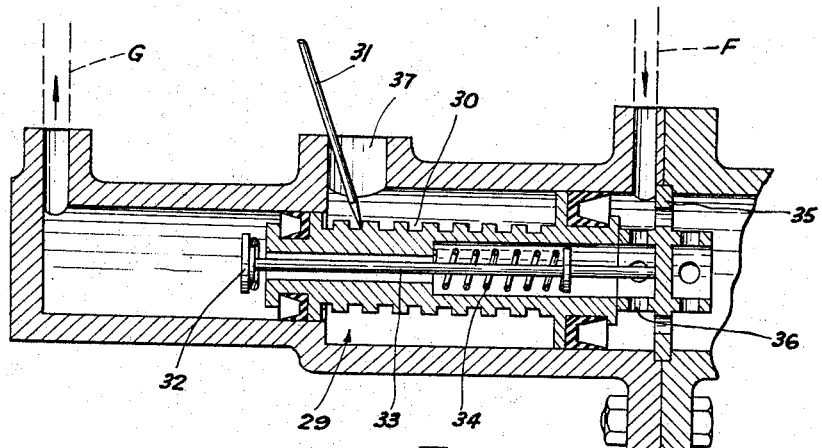
FIG. 5 is a section showing the parts for one sub-system of a running brake unit of still further modified construction. In this figure the parts are shown in draining and replenishment position.

The arrangement shown in FIG. 5 is much the same as that of FIG. 4, except that the piston 29 is elongated by having a body portion having grooves 30 in it for accommodation of a screw driver 31 or like object by which the piston can be held at the upstream end of its movement range instead of by use of a stop pin such as that marked 16 in FIG. 3. In this embodiment the movable valve closure is constituted by a valve head 32 on a stem 33. The stem is loaded by spring 34 which is able to abut an obstruction plate 35 which includes a holed wall 36 against which the piston is able to abut when at the upstream end of its movement range. The hole 37 is purely an access hole, the inlet duct and the outlet pipe being respectively indicated at F and G.

Figure 6:
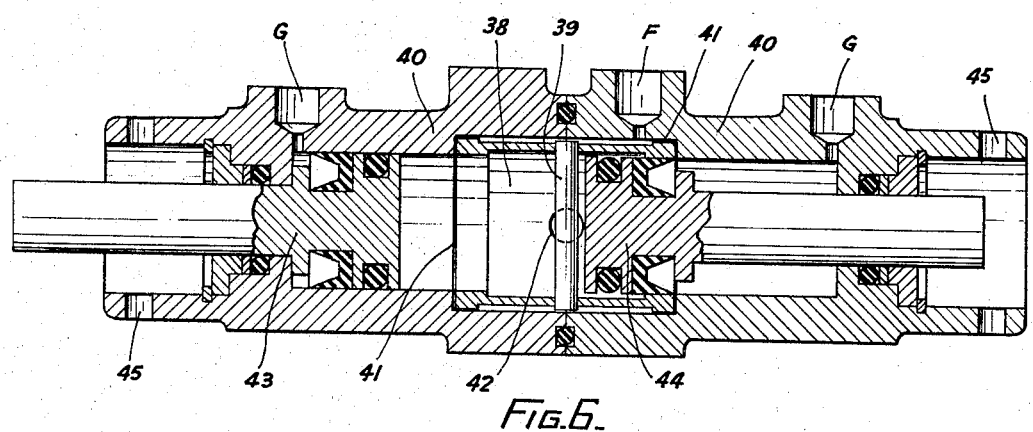

Referring to FIG. 6, the arrangement there shown is virtually the same as that described above in relation to FIGS. 2 and 3 except that the sleeves 10 and the spring 13 are dispensed with and replaced by a single sleeve 38 and a stop pin 39. The sleeve 38 is somewhat loose fitting in the casing 40, so to provide fluid passages 41 at each end of the sleeve, and has a number of holes 42 therein. Two of these holes receive stop pin 39 which thus acts to define the upstream ends of the movement ranges of the two pistons 43 and 44. Piston 43 is shown at the downstream end of its movement range and piston 44 is shown almost at the upstream end of its movement range and in these positions the two pistons illustrate the extremes of piston movement during normally effective use of the system. During such normal use, master cylinder pressure exerted through inlet duct F will be transmitted to the working faces of the piston by way of the space about sleeve 38 and through such of the holes 42 as are not blanked by having the stop pin 39 extending therethrough. This pressure imposed on the pistons will be transmitted through them and exerted in the outlets G substantially as previously explained. If the piston 44 (for example) should be in the position shown for it in FIGURE 6 (or even still closer to or touching the stop pin 39) not only will pressure be transmitted to outlet G but also there will be actual transmission of brake fluid through the space 41. This is desirable as it will ensure the sub-systems being maintained replete with fluid.

In the event of an undue pressure arising in either of the sub-systems, the undue pressure will move the affected piston to the upstream end of its movement range so that the excess pressure will be relieved by way of space 41. When the system is to be drained and replenished with brake fluid, the pistons 43 and 44 are moved into abutment with stop pin 39 and so held by obstruction pins inserted in holes 45. In the event of slow leakage in either of the sub-systems, the related piston will tend to move towards the position shown in FIGURE 6 for piston 43, and if the slow leak is allowed to accumulate, or in the event of an abrupt failure of a sub-system, the affected piston will move to the downstream end of its movement range and the faulty sub-system isolated.

Referring to FIGURE 7, the arrangement there shown is virtually the same as that shown in FIGURE 1 except for the seating ends of the shelves 10A being tapered as indicated at 46. The sleeves 10A may be furnished with holes (such as those marked 12 in FIGURE 3) or alternatively the sleeves 10A may simply be made loose fitting within the casing 47. A further difference illustrated by FIGURE 7 is the provision of caps 48 which carry contacts 49. These contacts are adapted to be bridged by the stems 8A when those stems approach the outermost portion of their movement range, so to close the electrical circuit of any conventional visible or audible warning device. The driver of a vehicle will thus be given warning when either or both of the brake sub-systems is approaching a point of failure due to leakage of fluid from a sub-system. The contacts 49 are spring loaded so that they may recede when pressed by a stem 8A. Thus, they will not prevent the stem moving to its outermost position as may occur in the event of an abrupt sub-system failure. With this provision, especially where a sub-system is subject to only minor leakage and thus in need of fluid replenishment, the driver of the vehicle will get a warning which will enable him to rectify the situation without having either of the sub-systems drift to the point at which that sub-system becomes useless. In this connection the spring loading means for the contacts 49 will lightly oppose downstream movement of the related stem 8A into its "shut-down" position, and in the event of total shut-down not being necessary under the prevailing circumstances, the spring loading effect of the contacts will tend to restore the affected stem 8A and its piston to an upstream position. If desired, this upstream restoration effect may be supplied entirely by the spring loading means for contacts 49. In addition, however, spring loading may be increased by sleeving a compression spring on stem 8A between the surface marked 50 and 51 in FIGURE 7.

Referring to FIGURE 8, the arrangement there shown provides an inlet duct F which extends into the casing, as tube 52, through which master cylinder pressure may be exerted on the pistons 53 and 54. This tube 52 also acts as a stop pin providing the same effect as described above in relation to stop pin 39 in FIGURE 6. This arrangement is otherwise similar to that shown in FIGURE 6 except for the provision in the casing of grooves 55 and in providing the pistons with counter-bores 56 which open to the upstream faces of the pistons and also have duct passages 57 and 58 leading to grooves 59 and 60 formed in the piston to house sealing rings 61 and 62. During normal brake use, the pistons (in the embodiment of FIGURE 8) will act in the same way as described above in relation to the earlier figures of the drawings. In the event of excess pressure arising in one of the sub-systems the affected piston will move to the upstream end of its movement range as shown at the right of FIGURE 8. Under these circumstances the outer lip of sealing ring 59 will be aligned with groove 55 so that the excess pressure is able to break the seal otherwise due to ring 59, thus fluid may leak past ring 59 and by displacement of ring 62 uncovering duct 57, enable the excess pressure to be relieved by way of duct 57 and counter-bore 56. The tube 52 is cylindrical and, therefore, not a closure for the open end of counter-bore 56. This pressure relieving function will operate in reverse when a sub-system is to be replenished with fluid, as in that case the piston 54 (for example) would be locked (in the position shown for piston 58) by insertion of a pin in holes 63. Under these circumstances, master cylinder pressure will send fluid to the outlet G by way of counter-bore 56, duct 57 and groove 55.

In the arrangement shown in FIGURE 9, a stop pin 64 is provided which acts the same way as stop pin 39 in FIGURE 6. In this embodiment however, the pistons 65 and 66 run in sleeves 67 and 68 which are longitudinally movable within the casing. Pin 64 provides limit for movement of sleeve 68 and each of these sleeves is itself furnished with a stop pin 69 which sets a limit to upstream movement of the piston 66. Sleeve 68 has a port 70 therein which will be closed (as shown at the left hand side of FIGURE 9) when sleeve 68 moves to the upstream end of its movement range by then being closed by sealing bush 71. In this embodiment of the invention, normal use of the system will cause sleeve 68 to remain in the position shown to the right-hand of FIGURE 9 by reason of the intensity of pressure being greater on face 72 than it is on face 73. This higher pressure being due to the fact that the area of the downstream face of piston 66 exposed to pressure, is considerably less than the area of the upstream surface of the piston by reason of the presence of the stem 74. Thus, pressure is exerted through port 70 for brake application purposes. When excess pressure arises in a sub-system, piston 66 and sleeve 68 move to the position shown to the right of FIGURE 9, thus permitting relief of excess pressure by reason of grooves 75 permitting the pressure fluid to get past the sealing ring 76. In the same way, the positioning of piston 66 as shown to the right of FIGURE 9 clears the way for draining and replenishing the system in the manner previously explained.

In the event of leakage in one of the sub-systems, reduction of pressure on the downstream side of piston 66 and on the sleeve face 72 will cause the piston and the sleeve to move to the positions shown to the left of FIGURE 9, thus, sealing off the faulty sub-system.

I claim:

1. In a hydraulic brake system of the kind comprising a master cylinder, two sub-systems each incorporating brake shoe actuating means and concurrently operable by fluid pressure increase in said master cylinder, and means to enable either of said sub-systems to remain effective notwithstanding failure of the other; a running brake unit comprising, for each of said sub-systems, an operating cylinder having an outlet pipe leading from its downstream end to its related shoe actuating means and its upstream end open to said master cylinder by way of a fluid inlet duct, a piston in said cylinder, a movable valve closure operatively associated with said piston and so arranged as to remain closed when said piston is at any point in said operating cylinder other than the upstream end of said piston's movement range within said cylinder, and obstruction means whereby said piston may be held at said upstream end of its movement range thereby to permit opening of said valve closure so to by-pass said piston and render said outlet pipe and said inlet duct each directly communicable with the other.

2. A running brake unit according to claim 1 wherein said movable valve closure comprises a channel-sectioned sealing ring mounted on said piston, and which includes an orificed sleeve loosely mounted at the upstream end of said cylinder, and a stop-pin which is carried by said sleeve and against which said piston abuts at the upstream end of its movement range.

3. A running brake unit according to claim 1 wherein said piston is mounted on a stem able to bridge a pair of spring-loaded contacts when said piston approaches the downstream end of its movement range, said contacts being included in the circuit of a warning device.

4. A running brake unit according to claim 1 wherein said movable valve closure comprises a channel-sectioned sealing ring mounted on said piston, wherein said cylinder has a groove in its wall with which a lip of said sealing ring becomes aligned when said piston is at the upstream end of its movement range, and wherein said piston is furnished with a duct passage whereby the opposite faces of said piston may be placed in communication by way of said groove.

5. A running brake unit according to claim 1 wherein said piston is housed in a sleeve which is longitudinally slidable within said cylinder and which has a port therein adapted to be closed when said sleeve is at the downstream end of its movement range within said cylinder, and wherein the upstream end of the range of movement of said piston is defined by a through-pin mounted on said sleeve, and the upstream end of the range of movement of said sleeve is defined by a stop-pin stationarily mounted in relation to said cylinder.

6. In a hydraulic brake system of the kind comprising a master cylinder, two sub-systems each incorporating brake shoe actuating means concurrently operable by fluid pressure increase in the master cylinder, and means to enable either of the sub-systems to remain effective notwithstanding failure of the other, a running brake unit comprising, for each of the sub-systems, an operating cylinder having an outlet pipe leading from its downstream end to its related shoe actuating means and having its upstream end open to the master cylinder by way of a fluid inlet duct, a piston in the cylinder, a movable valve closure operatively associated with the piston, a loading spring which urges the closure to remain in its closed position, and obstruction means whereby the closure is opened to by-pass the piston so to place the inlet duct and the outlet pipe in direct communication when the piston is at the upstream end of its movement range.

7. A unit according to claim 6 wherein said valve closure and said obstruction means are constituted by an axially movable sleeve into which said piston may enter, an outwardly directed holed flange on one end of said sleeve, a counterbore step in said cylinder upon which said holed flange is able to seat, and an inwardly directed flange on the other end of said sleeve against which said piston is able to abut.

8. A unit according to claim 6 wherein said valve closure and said obstruction means are constituted by a valve head on a stem housed in a passage inside said piston, and an obstruction plate at the upstream end of said cylinder against which said stem is able to abut, said passage being such as to open to both the upstream and downstream sides of said piston and to provide a seating for said valve head.

9. A unit according to claim 6 which includes means to hold said piston at the upstream end of its movement range.

10. A unit according to claim 9 wherein said means to hold said piston comprise a stem upon which the piston is mounted and which extends through the downstream end of the cylinder, and a stop-pin insertable through holes in an extension on said cylinder to bear against the downstream end of said stem.

11. A unit according to claim 8 wherein said piston is elongated by having a body portion having grooves in it, and wherein said cylinder has an access hole in it through which a tool may be entered to engage said grooves.

No references cited.

MARTIN P. SCHWADRON, *Primary Examiner.*

R. R. BUNEVICH, *Assistant Examiner.*